United States Patent [19]
DeArmond

[11] Patent Number: 5,609,325
[45] Date of Patent: Mar. 11, 1997

[54] WEED PULLING DEVICE

[76] Inventor: William L. DeArmond, 3710 Bembow Dr., Redding, Calif. 96002

[21] Appl. No.: 403,179

[22] Filed: Mar. 13, 1995

[51] Int. Cl.[6] ................................................ B66F 3/00
[52] U.S. Cl. .......................................................... 254/132
[58] Field of Search .................................. 254/130, 129, 254/30, 132, 131.5, 131; 294/50.8, 50.9, 50.5, 49, 59, 60

[56] References Cited

U.S. PATENT DOCUMENTS

| | | | |
|---|---|---|---|
| D. 263,548 | 3/1982 | Rodgers et al. | |
| D. 318,993 | 8/1991 | Brady. | |
| 1,107,705 | 8/1914 | Ruddy | 254/132 |
| 1,564,373 | 12/1925 | Smith | 254/132 |
| 3,865,348 | 2/1975 | Close | 254/132 |
| 3,976,282 | 8/1976 | Baker | 254/132 |
| 4,281,866 | 8/1981 | Atcheson | 254/132 |
| 4,916,815 | 4/1990 | Ohmura | 30/151 |
| 5,092,046 | 3/1992 | Collins | 30/151 |
| 5,188,340 | 2/1993 | Green. | |
| 5,244,241 | 9/1993 | Lee. | |

*Primary Examiner*—Robert C. Watson
*Attorney, Agent, or Firm*—Boniard I. Brown

[57] ABSTRACT

A weed pulling device includes a handle, a shaft, a blade, a step member, and a leverage member for the removal of weeds. The blade may be integrally formed with the shaft or may be attached to one end of the shaft. The shaft extends partially into the handle for attachment of the shaft to the handle. The step member and the leverage member are attached to the handle and the shaft, either singly or in combination. The blade has a forked portion for engagement with the weed and a tapered portion for facilitating insertion of the blade into the ground. The leverage member may be used for pivotal movement of the weed pulling device, for providing leverage during removal of the weed, and for compressing loose din removed during the weed removal process. The handle is sized so that a person may remove a weed from a standing position, without kneeling on the ground and with minimal bending. The weed pulling device may further include a supra member or metal band attached to an end of the handle for supporting the shaft within the handle, a hole for hanging the weed pulling device during storage, a cap mounted on the handle for providing cushioning, and a cap engageable with the blade for protection from sharp edges of the blade.

11 Claims, 1 Drawing Sheet

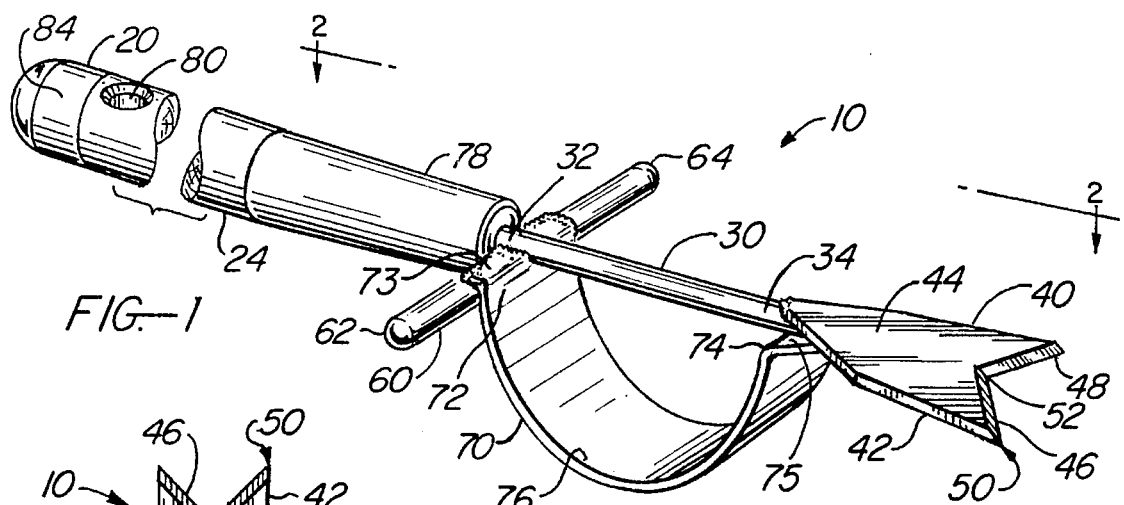
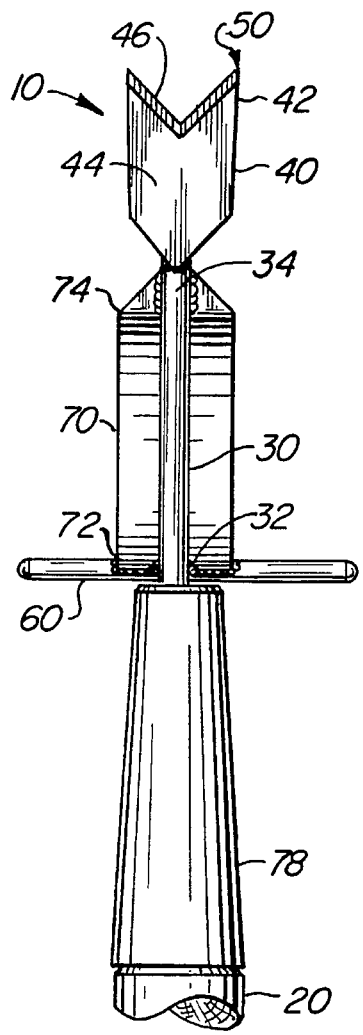
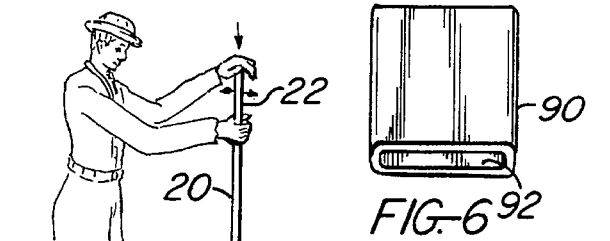
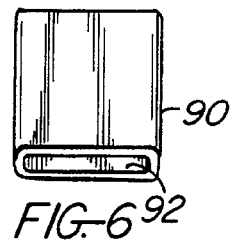
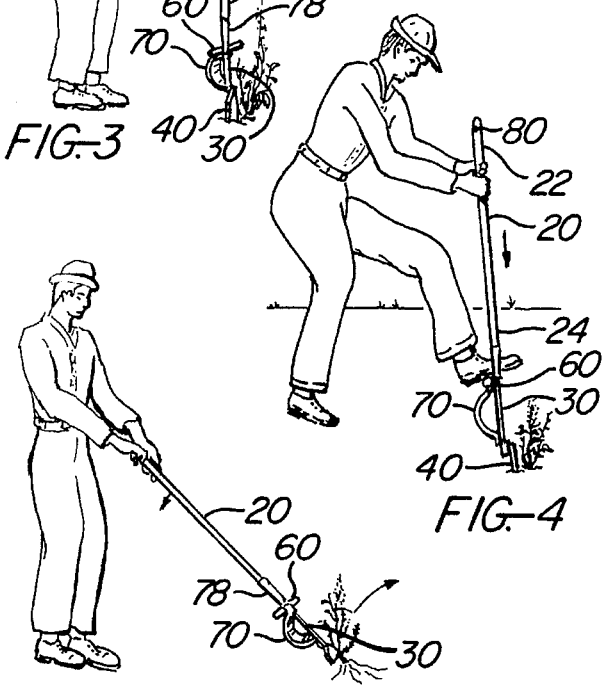

5,609,325

WEED PULLING DEVICE

BACKGROUND OF THE INVENTION

The invention relates to the removal of weeds and, more particularly, to a weed pulling device having a curved portion for providing leverage and assisting in the movement of the weed and replacement of the ground after removal of the weed.

Various types of tools have been used to remove weeds and other unwanted plants from the ground The tools often leave big holes in the ground, remove too large of an area of grass, fail to remove all of the roots of the weed, or require a person to be on their knees to remove the weed.

There are several kinds of tools made specifically for the removal of weeds and plants. One such device is disclosed in U.S. Pat. No. 5,244,241 issued Sep. 14, 1993 to Lee and entitled "Weeding and Picking Implement". The tool includes a forked portion having an obliquely extending stick for holding the weed during removal. However, the tool does not provide a means for using leverage to remove a weed or for replacing any dirt removed from the ground during the removal process.

U.S. Pat. No. 5,188,340 issued Feb. 23, 1993 to Green and entitled "Weed Extraction Device" discloses a tool having a step portion for insertion of a root trap into the ground for removal of a weed. However, the tool does not provide a means for leverage or for compressing the ground after removal of the weed.

Therefore, what is needed is an apparatus having a means for providing leverage to remove a weed and for replacing and compressing loose dirt removed during weed removal and having a step member for easily and efficiently removing weeds from a standing position.

SUMMARY OF THE INVENTION

A weed pulling device includes a handle having a first end and a second end. A blade has a first end positioned adjacent to the second end of the handle and a second end for insertion into the ground. A step member is positioned adjacent to the second end of the handle and a leverage member is positioned between the step member and the blade. The weed pulling device further includes a shaft having a first end attached to the handle and a second end, which may be integrally formed with the blade or attached to the blade.

The blade has a forked portion for engagement with a weed and a tapered end for insertion into the ground. The weed pulling device may further include a hole provided in the handle for hanging the weed pulling device during storage, a support member attached to the handle for supporting the second end of the handle, and a removable cap engageable with the blade for providing protection from the blade during storage of the weed pulling device.

The handle is sized and adapted so that a person may remove weeds from a standing position. The leverage member allows a person to use leverage to remove a weed during weed removal, may be used to move aside the weeds, and may be used to compress and smooth loose dirt after the weed removal.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is an illustration of a weed pulling device;

FIG. 2 is a view taken along line 2—2 of FIG. 1;

FIG. 3 is an illustration of a person inserting the weed pulling device into the ground;

FIG. 4 is an illustration of a person applying force to a step member of the weed pulling device;

FIG. 5 is an illustration of a person manipulating the weed pulling device to remove a weed from the ground; and FIG. 6 is an illustration of a cap engageable with the weed pulling device.

DESCRIPTION OF THE PREFERRED EMBODIMENT

The invention described herein provides an apparatus for the removal of weeds.

Referring to FIG. 1–3, a weed pulling device 10 includes a handle 20 having a first end 22 and a second end 24. The first end 22 of the handle 20 may be grasped by a person for manipulation of the weed pulling device 10. The handle 20 may be constructed of wood, metal or the like for providing a sturdy handgrip and component of the weed pulling device 10. The handle 20 is sized such that a person may utilize the weed pulling device 10 in a standing position.

A shaft 30 is attached to the second end 24 of the handle 20. The shaft 30 has a first end 32 and a second end 34. The first end 32 of the shaft 30 may be inserted partially into the handle 20 and secured together either mechanically or with an adhesive. Alternatively, the shaft 30 and handle 20 may be integrally formed together or the shaft 30 may be welded to the handle 20. The shaft 30 may be constructed of metal, plastic or a similar material for resisting bending during the weed removal process.

The weed pulling device 10 includes a blade 40 attached to the shaft 30 or alternatively, integrally formed with the shaft 30. A first end of the blade 40 may be attached to the second end 34 of the shaft 30, such as by welding. The blade 40 may be constructed of metal or a similar material for resisting deformation during the weed removal process.

A second end of the blade 40 includes a forked portion 42 having a flat surface 44 and a tapered end 46. The tapered end 46 is inserted into the ground adjacent to the weed and may be sharpened for easy insertion of the weed pulling device 10 into the ground. The forked portion 42 includes a first extended portion 48, a second extended portion 50, and a notched portion 52 therebetween. The notched portion 52 engages the weed beneath the surface of the ground and at least partially surrounds the root of the weed. The notched portion 52 may contact the root of the weed for loosening the weed from the ground, or alternatively, may cut the roots of the weed for removal of the roots and the greenery of the weed. The flat surface 44 aids in the removal of the weed by contacting the roots and applying pressure to the weed to force the weed from the ground.

The weed pulling device 10 includes a step member 60 attached to the shaft 30 and to the handle 20, singly or in combination. The step member 60 is a cross-bar attached at approximately a midpoint for providing a first step portion 62 and a second step portion 64 extending from opposite sides of the shalt 30. A person may step on or otherwise apply pressure to the step member 60 for forcing the blade 40 of the weed pulling device 10 into the ground. The step member 60 may be constructed of metal, wood, plastic, or the like.

Referring to FIGS. 1–5, the weed pulling device 10 includes a leverage member 70 positioned between the handle 20 and the blade 40 for providing a means for supporting pivotal movement of the weed pulling device 10 during operation of the weed pulling device 10. The leverage member 70 provides support during the weed removal process by enabling a person to use leverage to remove the weed.

The leverage member 70 has a first end 72, a second end 74, and a curved portion 76 arcuately extending therebetween. The curved portion 76 provides a surface for contacting the ground to compress or smooth any loose debris or dirt loosened or removed from around the weed during the weed removal process. The leverage member 70 may also be utilized to move the weed, such as pushing the greenery of the weeds aside to provide space and visibility to insert the weed pulling device 10 adjacent to the weed to be removed, or to move the weed and dirt during weed removal. As an example, the weed pulling device 10 may be rotated as illustrated in FIG. 5, causing the leverage member 70 to contact the weed and loosened dirt. Alternatively, the leverage member 70 may be shaped having a flat or non-curved surface for performing the same functions as the curved portion. As an example, the leverage member 70 may be angular, rectangular, triangular, or the like.

The first end 72 of the leverage member 70 has a lip 73 for attachment of the leverage member 70 to at least one of the shaft 30 and the step member 60, such as by welding or mechanical means. The second end 74 of the leverage member 70 has a lip 75 for attachment of the leverage member 70 to an opposite end of the shaft 30. The leverage member 70 may be constructed of metal, plastic, or a similar material A support member 78 is positioned around the second end 24 of the handle 20 adjacent to the shaft 30 for providing additional support and securement of the handle 20 and the shall 30. The support member 78 may be a metal band or the like.

A hole 80 is provided in the first end portion 22 of the handle 20 for providing a means for hanging the weed pulling device 10 during storage of the weed pulling device 10.

A cap 84 is preferably of rubber or resilient plastic and is mounted on the handle end for cushioned engagement with the hand of a user.

Referring to FIG. 6, a cap 90 is engageable with the blade 50 for providing protection from the sharp edges of the blade 50. The cap 90 has a bore 92 partially therethrough for disposing the cap 90 onto the blade 50. Alternatively, the cap 90 may have a first and second portion engageable with the first extended portion 48 and the second extended portion 50 of the forked portion 42. The cap 90 may be constructed from rubber, vinyl, plastic or similar durable material for providing flexibility in positioning the cap 90 onto the blade 50 and for providing protection to a person.

As one example, the overall length of the weed pulling device 10 may be approximately 44 inches for eliminating the need for a person to kneel and reducing the amount of bending for a person during use of the weed pulling device 10. The handle 20 may be approximately 37 inches long and 1¼ inches in diameter. The blade 30 may be approximately 12 inches long having approximately 5 inches positioned within the handle 20 and approximately 7 inches extending from an end of the handle 20. The leverage member 70 may be approximately 4 inches in length, approximately 2½ inches in depth, and approximately 1¼ inches in width and having a thickness of ⅛ inch. The blade 50 may be approximately 1¼ inches long, ¾ of an inch wide, and ⅛ of an inch thick.

Referring to FIGS. 3–5, in operation, a person positions the weed pulling device 10 adjacent to a weed and steps on the step member 60 for insertion of the blade 50 of the weed pulling device 10 into the ground adjacent to the weed. By pushing and pulling on the handle 20, the ground adjacent to the weed is loosened. Pivoting the weed pulling device 10 allows the leverage member 70 to contact the ground or other surface and provide leverage. Continually applied pressure causes the blade 50 to force the weed from the ground.

Therefore, the invention provides an apparatus for the efficient and easy removal of a weed.

I claim:

1. A weed extracting device comprising:

a handle having an end, a shaft extending axially from said handle end, said shaft having an end, a step member mounted transversely of the handle and adjacent to said handle end, a blade attached at said shaft end and adapted for insertion into the ground, and an arcuate leverage member mounted between said step member and said blade and extending outwardly from the shaft, whereby upon rotation of the handle to rotate the leverage member on the ground a weed is uprooted.

2. The weed extraction device according to claim 1, wherein said step member has a first step portion extending in a first direction from said handle and a second step portion extending in an opposite second direction from said handle for forming two steps for a person to apply pressure to said weed pulling device.

3. The weed extraction device according to claim 1, wherein said blade has a forked portion for engagement with a weed.

4. The weed extraction device according to claim 1, wherein said second end of said blade has a tapered end for insertion into the ground.

5. The weed extraction device according to claim 1, wherein said leverage member has at least one lip for attachment of said lip to said weed pulling device.

6. The weed extraction device according to claim 1, further comprising a support member attached to said handle for supporting said end of said handle.

7. The weed extraction device according to claim 1, wherein said handle is sized and adapted so that a person may remove weeds from a standing position.

8. A weed extraction device comprising:

an elongated handle having an axially extending shaft portion with an end, an arcuate leverage member having first and second ends, said leverage member being coextensive with said shaft portion and being mounted adjacent said shaft portion end, blade means connected with said shaft portion end and adapted for insertion into the ground for engaging a weed, and a step member mounted transversely of the handle shaft portion and adjacent thereto and to a second end of the arcuate leverage member.

9. The weed extraction device according to claim 1, wherein said blade means is integrally formed with said shaft portion.

10. The weed extraction device according to claim 1, and further comprising a support member attached to said handle for securing together said handle and said shaft portion.

11. The weed extraction device according to claim 8, wherein said blade has a forked portion for engagement with said weed and a tapered end for insertion into the ground.

\* \* \* \* \*